(12) United States Patent
Vallés Navarro et al.

(10) Patent No.: US 8,573,546 B2
(45) Date of Patent: Nov. 5, 2013

(54) VERTICAL COLUMNS OF DOLLIES USED FOR FILMING

(76) Inventors: Alfredo Vallés Navarro, Cornellá de Llobregat (ES); Andrés Vallés Navarro, Cornellá de Llobregat (ES)

( * ) Notice: Subject to any disclaimer, the term of this patent is extended or adjusted under 35 U.S.C. 154(b) by 68 days.

(21) Appl. No.: 13/147,050

(22) PCT Filed: Feb. 2, 2010

(86) PCT No.: PCT/ES2010/000039
§ 371 (c)(1),
(2), (4) Date: Jul. 29, 2011

(87) PCT Pub. No.: WO2010/086479
PCT Pub. Date: Aug. 5, 2010

(65) Prior Publication Data
US 2012/0018596 A1    Jan. 26, 2012

(30) Foreign Application Priority Data
Feb. 2, 2009   (ES) .................................. 200900289

(51) Int. Cl.
*F16M 11/00*   (2006.01)
(52) U.S. Cl.
USPC .................... 248/161; 248/125.1; 248/125.8; 248/129; 352/243

(58) Field of Classification Search
USPC .............. 248/129, 130, 131, 132, 133, 125.1, 248/125.8, 161; 352/243
See application file for complete search history.

(56) References Cited

U.S. PATENT DOCUMENTS

| 4,715,573 | A | * | 12/1987 | Liegel | 248/129 |
| 5,165,632 | A | * | 11/1992 | Kuan | 248/129 |
| 7,048,238 | B2 | * | 5/2006 | Rotondi | 248/125.8 |
| 7,832,694 | B2 | * | 11/2010 | German et al. | 248/125.8 |
| 8,282,052 | B2 | * | 10/2012 | Huang | 248/125.1 |
| 2004/0004165 | A1 | * | 1/2004 | Hong et al. | 248/132 |

FOREIGN PATENT DOCUMENTS

| DE | 3424261 | 1/1986 |
| EP | 0755896 | 1/1997 |
| ES | 2297680 | 5/2008 |
| WO | 9911558 | 3/1999 |

* cited by examiner

*Primary Examiner* — Terrell McKinnon
*Assistant Examiner* — Monica Millner
(74) *Attorney, Agent, or Firm* — Shoemaker and Mattare

(57) ABSTRACT

A dolly used for filming includes a vertical telescopic column having a filming head or camera positioned on the end thereof. The column includes a movable tube placed externally around a stationary main column; the movable tube is connected to the end of the telescopic column. A camera-supporting element is in turn movably mounted on the movable tube, and a tilting mechanism is included as well.

4 Claims, 1 Drawing Sheet

VERTICAL COLUMNS OF DOLLIES USED FOR FILMING

FIELD OF THE INVENTION

The present invention develops some improvements to the dollies used for filming, intended for dollies that include a telescopic column having a head or camera positioned on the end thereof, the invention improving the possible movements of said filming head.

PRIOR ART

There exist in the market many vertical telescopic columns for displacement of filming or video cameras. Known functioning thereof comprises a system of telescopic tubes that in essence are inserted within each other so that the assembly ascends when the sections thereof emerge actuated by a motor intended to raise the position of the camera.

Said devices, though, pose a problem in that there exists a direct relation between the maximum and the minimum height of the optics. The camera is hence always positioned on the upper portion of the last telescopic tube to emerge, so that the minimum height of the optics is never lower than the height of the longest tube plus the height of the remaining tubes that have already emerged from the first tube.

Said minimum height can be modified so as to reduce it, by adding more tubes and by making them shorter. However, this solution is not viable because the resulting size and weight of the assembly are larger, and both its noise while in operation and its instability increase.

The main object of the present invention is solve said problem.

This and other advantages will become more apparent from the following description.

BRIEF EXPLANATION OF THE INVENTION

The present invention develops some improvements to the dollies used for filming, intended for dollies that include a telescopic column having a filming head or camera on the end thereof, wherein the possible movements of said filming head are improved thanks to providing an additional movable tube placed externally around the telescopic device, wherein the filming head, thanks to a movable supporting element, can descend to the base thereof, said movable tube having a height not lower than that of the first section of the telescopic tube of the dolly's vertical column.

It is thus provided a vertical column and a movable tube placed externally therearound, a movable supporting element on said external tube and respective PAN and TILT control mechanisms actuating on both the supporting element of the system and the supporting element of the camera head.

In this manner the objects intended for the invention are achieved, since the camera, which leans on the movable supporting element, can move downwards to the lowest position of the dolly's vertical column thanks to the descent of said supporting element to the lowest position of said external tube.

BRIEF DESCRIPTION OF THE DRAWINGS

For a better understanding of the invention it is accompanied by a sheet of merely illustrative and non-limiting drawings.

DETAILED EXPLANATION OF THE INVENTION

The present invention consists of some improvements to the dollies used for filming, intended for dollies that include a vertical telescopic column having a filming head or camera positioned on the end thereof and including a movable tube (2) placed externally around said main column (1), which tube (2) is connected to the very end of said mechanism or telescopic column (1), said movable tube (2) moving in relation to said main tube (1).

Additionally, there is provided a movable supporting element (3) that is moved along said movable tube (2). When the vertical column or main column (1) is in its retracted initial position, said movable tube (2) can reach the dolly's supporting platform (6). In the preferred embodiment of the invention the foregoing is simply the consequence of both the main column (1) and the movable tube (2) having the same or very similar length.

Figure 1:
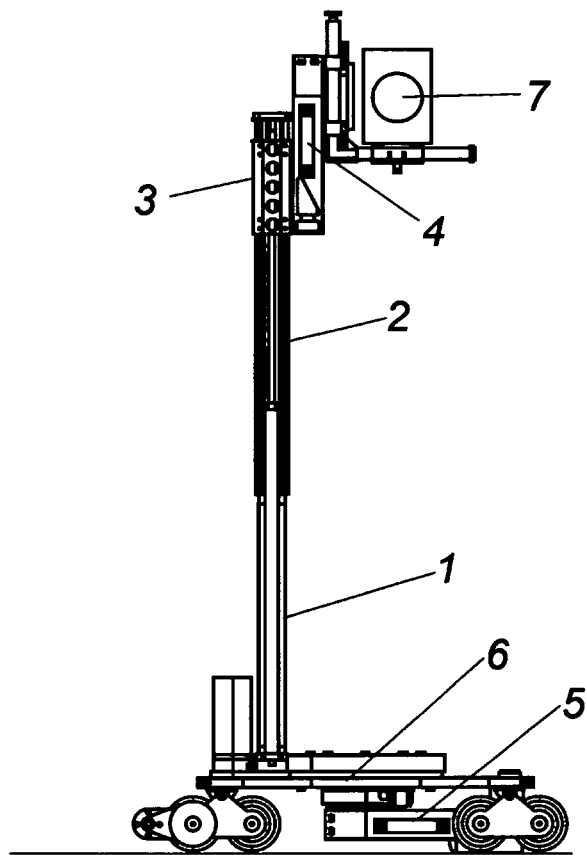
FIG. 1 is a schematic elevational view of dolly in accordance with the preferred embodiment of the invention, wherein the vertical column thereof is in an extended condition and the filming head is positioned at the highest position possible.
Figure 2:
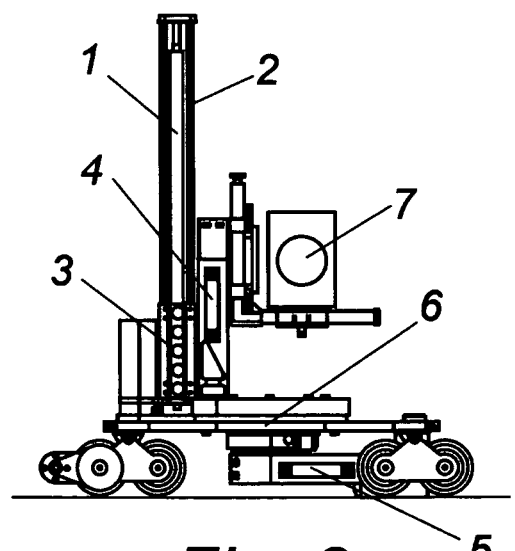
FIG. 2 is another view of the dolly of the previous figure wherein the filming head is placed at a low point relative to the column thanks to the movable tube of the invention.

Therefore, in said low position, as illustrated in FIG. 2, the movable supporting element (3) can reach a lower position that is flush with the low position of said main column (1), this significantly increasing the freedom of movement of the filming camera in the proximity to the ground area.

The camera head can be anyone of those already known in the art, especially of the type incorporating remote controlling, movement-stabilizing means and freedom of movement in the three axis, namely, PAN, TILT and ROLL.

In one of the possible embodiments of the invention, for instance, in the embodiment described in this specification and the drawings illustrating it as the preferred embodiment, a Tilt axis (4) is placed on said movable supporting element (3) and the camera (7) is positioned on said Tilt supporting element (4).

Additionally, said head or supporting element of the camera, in accordance with the above-described embodiment, can include its own Roll and Tilt axes (5).

A camera's PAN or a "right-left" panoramic movement mechanism is positioned under the supporting platform (6) in said preferred embodiment of the invention. Said PAN axis permits 360° continuous movements of the entire vertical column which result in said vertical column never being visible through the camera lens when said PAN movement is in progress. Said mechanism is implemented by means of a set of brushes so as to permit an unlimited rotating movement in said axis.

As for the movements of the movable tube (2) and the above-mentioned supporting element (3), they are controlled by motors and are proportional movements.

A dolly device in accordance with for instance the above-described embodiment of the present invention permits the disassembly of the camera axes and their use as remote head in other situations, such as, in a car, on a platform, etc.

It is understood that, finish or shape details in the present case are liable to variation provided that the essence of the invention is not altered.

The invention claimed is:

1. In a dolly for filming, which includes a vertical telescopic column adapted to support a filming head or camera on an end thereof, the improvement wherein the telescopic column comprises a main tube and
- a movable tube placed externally around said main tube, the movable tube being connected to the very end of said main tube,
- said movable tube moving in relation to said main tube; and
- a movable supporting element that moves along said movable tube,
- wherein a tilt supporting element is positioned on said movable supporting element and the camera is then placed onto said tilt supporting element.

2. A dolly according to claim 1, further comprising, under the supporting platform, a pan movement mechanism, said pan movement mechanism having a set of brushes, thereby permitting an unlimited 360° rotation.

3. In a dolly for filming, which includes a vertical telescopic column adapted to support a filming head or camera on an end thereof, the improvement wherein the telescopic column comprises a main tube and
- a movable tube placed externally around said main tube, the movable tube being connected to the very end of said main tube,
- said movable tube moving in relation to said main tube; and
- a movable supporting element that moves along said movable tube, and
- motors for controlling movement of said movable tube and said supporting element.

4. A dolly according to claim 3, further comprising electronic means for controlling said motors.

\* \* \* \* \*